United States Patent
Hashimoto et al.

[11] Patent Number: 6,101,191
[45] Date of Patent: Aug. 8, 2000

[54] NETWORK CONNECTION CIRCUIT

[75] Inventors: Naoya Hashimoto; Hiroshi Takenoshita; Kenichi Toya, all of Tokyo, Japan

[73] Assignee: Oki Electric Industry Co., Ltd., Tokyo, Japan

[21] Appl. No.: 08/982,408

[22] Filed: Dec. 2, 1997

[30] Foreign Application Priority Data

Dec. 25, 1996 [JP] Japan .................................. 8-345566

[51] Int. Cl.⁷ .............................. H04L 12/18; H04L 12/46
[52] U.S. Cl. ........................... 370/420; 370/434; 370/463
[58] Field of Search .................................... 370/401, 463, 370/420, 421, 434, 407; 340/825.06; 709/250

[56] References Cited

U.S. PATENT DOCUMENTS

| | | | |
|---|---|---|---|
| 4,514,841 | 4/1985 | Sem-Sandberg | 370/463 |
| 5,136,583 | 8/1992 | Kondo | 370/463 |
| 5,400,326 | 3/1995 | Smith | 370/401 |
| 5,477,547 | 12/1995 | Sugiyama | 370/401 |
| 5,715,251 | 2/1998 | Du | 370/401 |
| 5,841,990 | 11/1998 | Picazo | 370/401 |
| 5,884,040 | 3/1999 | Chung | 370/401 |

FOREIGN PATENT DOCUMENTS

WO95/01023   1/1995   WIPO .................................. 370/401

*Primary Examiner*—Ricky Ngo
*Attorney, Agent, or Firm*—Venable; Robert J. Frank; Allen Wood

[57] ABSTRACT

To cascade a network line concentrator and a plurality of terminals, the network connection circuit installed in each of the plurality of terminals forwards first data in a direction from the line concentrator to the neighboring terminal, provides the first data for the terminal, forwards second data in direction from the neighboring terminal to the network line concentrator, and transfers third data from the terminal toward the network line concentrator.

26 Claims, 10 Drawing Sheets

NETWORK CONNECTION CIRCUIT

BACKGROUND OF THE INVENTION

1. Field of the Invention

The present invention relates to a network such as a LAN (Local Area Network), and more specifically to a network connection circuit which connects a terminal to the network.

2. Description of the Prior Art

There has been used a network connection circuit connecting a terminal to a network. FIG. 10 shows the configuration of a conventional network connection circuit for a LAN, provided in a terminal. As shown in FIG. 10, the LAN connection circuit 1-1 comprises the LAN cable connector 1-10 connected to a LAN via the packet receipt cable 1-12 and the packet transmission cable 1-11, the packet transmission filter 1-20, the packet receipt filter 1-21, the transceiver 1-22 driving the LAN physical layer, the signal line 1-13 laid between the transceiver 1-22 and the packet transmission filter 1-20, the signal line 1-14 laid between the transceiver 122 and the packet receipt filter 1-21, the LAN controller (LANC) 1-23 which controls preparation and analysis of packets, the signal line 1-15 laid between the LAN controller 1-23 and the transceiver 1-22, the signal line 116 laid between the LAN controller 1-23 and the transceiver 1-22, and the signal line 1-17 laid between the transceiver 1-23 and the central control unit 1-24 connected to an upper layer such as an application (software), which controls the LAN controller 1-23 pursuant to the instruction of the upper layer.

The operation of the LAN connection circuit 1-1 during transmitting and receiving packets over the LAN is as follows, wherein the receipt operation will be described first, and the explanation of the transmission operation will follow. In case of receiving packets, the data from the LAN are reshaped, for example, at the receipt filter 1-21; undergo detection of error, are converted into a given level signal, and are descrambled at the transceiver 1-16; and are fed to the LAN controller 1-23. Further, the LAN controller 1-23 compares the destination address of the receipt data with the address of the terminal. If identical, the LAN controller 1-23 transfers the data to the central control unit 1-24.

In case of transmitting packets, the central control unit 1-24 requests the LAN controller 1-23 to transfer the data output from the upper layer. The LAN controller 1-23 prepares transmission of the packets, including insertion of preamble patterns into the header of the packets. The packets experience an electric conversion and a scramble processing at the transceiver 1-22 to reach the LAN via the transmission filer 1-20 and the LAN connector 1-10. The LAN connection circuit 1-1 as described above, serves for constructing a LAN system.

As shown FIG. 11, the LAN system incorporates a plurality of terminals 2-31, the network line concentrator 2-1 (e.g., HUB), and the backbone network 2-21, which forms a star connection as a topology. The LAN terminals 2-31 each have the LAN connection circuit 1-1 as shown in FIG. 10, which execute the transmission and receipt of data using it. Further, all of the LAN terminals 2-31 are connected to the terminal ports 2-11 of the network line concentrator 2-1 via the LAN cables 2-22. Similarly, the backbone network 2-21 is connected to the backbone network port 2-10 of the network line concentrator 2-1 via the LAN cable 2-20. Upon receipt of data in one of the ports 2-11, 2-10, the network line concentrator 2-1 forwards the data to all of the LAN terminals 2-31 or some thereof.

In such a LAN system, however, connecting one LAN terminal 2-31 to the network line concentrator 2-1 requires one port 2-11 thereof. If another LAN terminal 2-31 is added on the LAN system, it is necessary to replace the network line concentrator 2-1 with another network line concentrator which is capable of accommodating more LAN terminals 2-31, or to add another network line concentrator 2-1. Besides, with the star connection, the LAN system needs much time and money to extend the LAN cables 2-22 to the add-on LAN terminal 2-31, and more time and money if they are laid extremely far from the network line concentrator 2-1.

SUMMARY OF THE INVENTION

It is therefore an object of the present invention to provide a network connection circuit which is capable of cascading a plurality of terminals.

According to one aspect of the present invention, there is provided a network connection circuit for a terminal of a network which establishes a cascade connection of a plurality of terminals, comprising first forwarding means for forwarding first data in the direction from a first neighboring terminal to a second neighboring terminal; providing means for providing the first data for the terminal; second forwarding means for forwarding second data in the direction from the second neighboring terminal to the first neighboring terminal; and transferring means for transferring third data from the terminal to the first neighboring terminal.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

DESCRIPTION OF THE PREFERRED EMBODIMENTS

Hereinafter, an embodiment of the network connection circuit according to this invention will be now described in detail with reference to the accompanying drawings.

Figure 1:
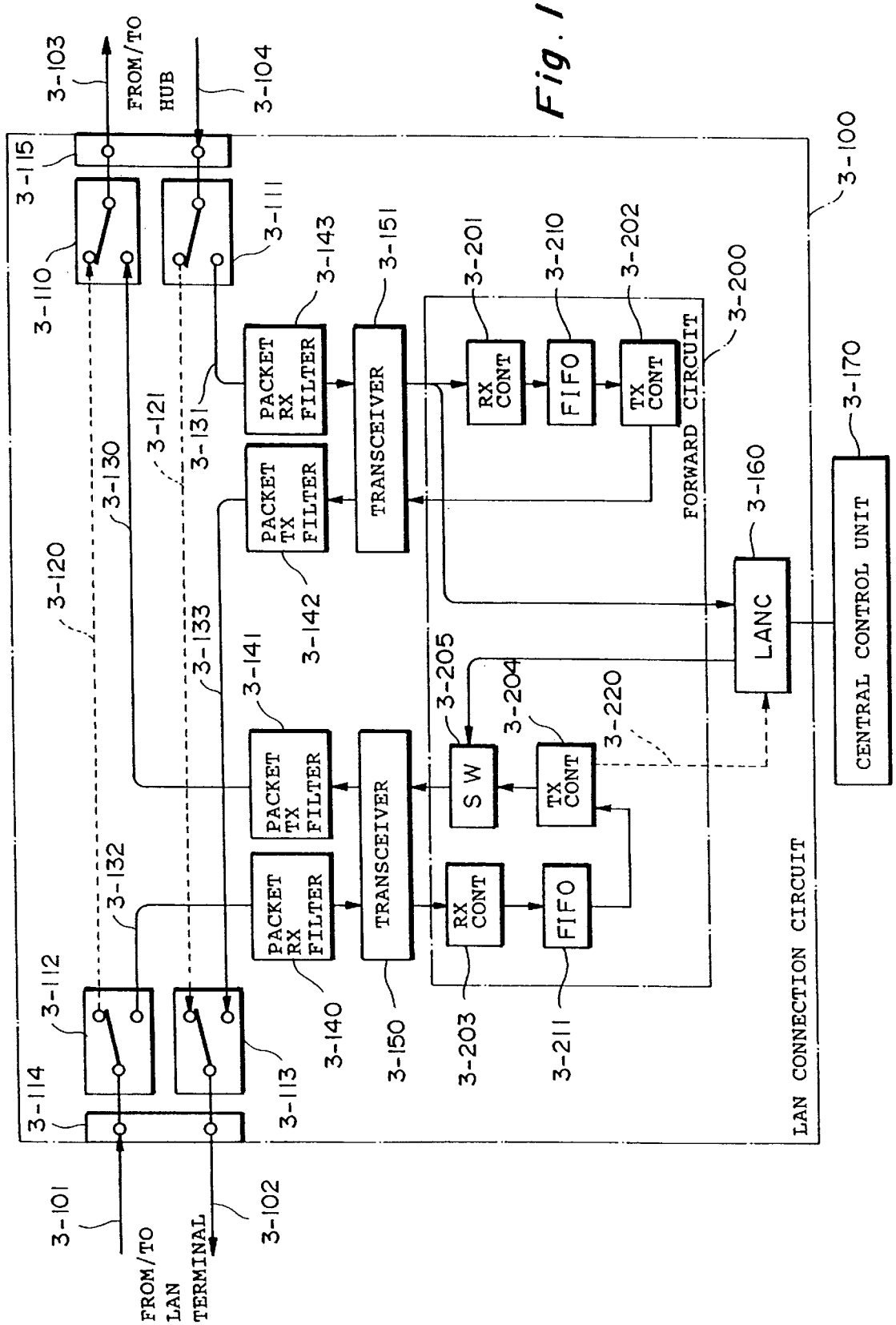
FIG. 1 is a block diagram showing an embodiment of the network connection circuit according to the present invention.

In FIG. 1, to forward Ethernet packets, the LAN connection circuit 3-100 in a LAN terminal (not shown) comprises the LAN connector 3-115 for connecting the network line concentrator (hereinafter, abbreviated as HUB) via the transmission pair cable 3-103 and the receipt pair cable 3-104, and the LAN connector 3-114 for connecting another LAN terminal via the transmission pair cable 3-102 and the receipt pair cable 3-101. As the LAN pair cables, twisted pair cables and untwisted pair cables are available. The LAN connection circuit 3-110, further comprises the relay switches 3-100, 3-112, and the line 3-120 acting to transfer data from the neighboring LAN terminal to the HUB, and the relay switches 3-111, 3-113, and the line 3-121 acting to transfer data from the HUB to the neighbouring LAN terminal. The data from the neighbouring LAN terminal ordinarily passes to the line 3-132, but directly passes via the line 3-120 at a failure in the power supply. Similarly, the data from the HUB ordinarily passes to the line 3-131, but directly passes via the line 3-121 at a failure in the power supply. This structure minimizes the influence of the failure in a power supply of a LAN terminal upon the whole LAN system. The packet transmission filters 3-141 and 3-142, the packet receipt filters 3-140 and 3-143, and the transceiver 3-150 and 3-151 have the same functions as those of the conventional packet transmission filters, packet receipt filters, and transceivers, respectively, wherein the connections of those components are identical with the conventional connections. In addition, the LAN connection circuit has the forward circuit 3-200.

The forward circuit 3-200 mainly serve to forward data between the HUB and the neighbouring LAN terminal, which incorporates the receipt controllers 3-203, 3-201 and the transmission controller 3-204, 3-202, the FIFO (First-In First-Out) memories 3-211, 3-210, and the path switch-over 3-205. The receipt controllers 3-203 and 3-201, both of which have the same functions, receive receipt data from the respective transceivers 3-150 and 3-151, and also delete the preamble 4-1 and the frame starting delimiter (SFD) 4-2 as shown in FIG. 2, from the receipt data, thus respectively storing in the FIFO memories 3-211 and 3-210 the receipt packets without the preamble pattern 4-1 and the frame starting delimiter 4-2, which are referred to as MAC (Media Access Control) packets.

Figure 2:
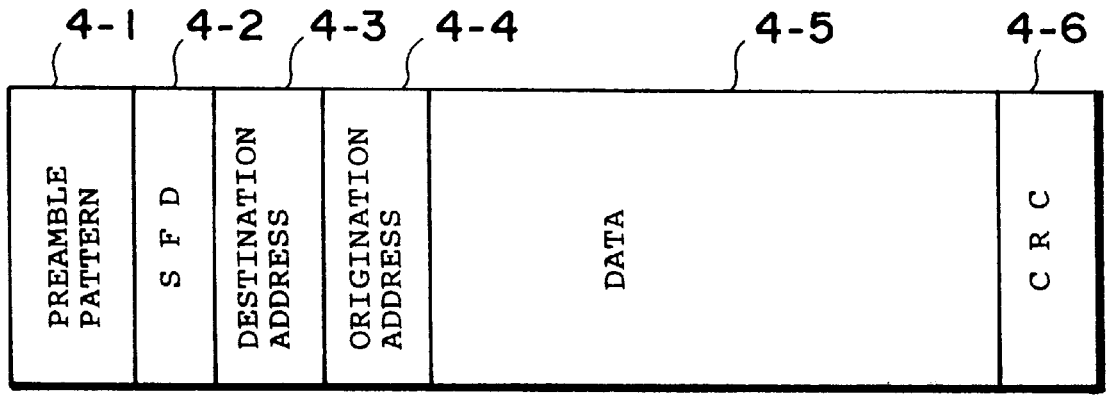
FIG. 2 is a diagram showing the format of packets for use in the network system employing the network connection circuit.

As shown in FIG. 2, The packet in the Ethernet generally includes the preamble pattern 4-1 for synchronization, the frame starting delimiter 4-2 for designating the starting point of the information laid in the packet, the destination address 4-3, the origination address 4-4, the data 4-5, and the check code (CRC: Cyclic Redundancy Check) 4-6, where they are composed of seven octets, one octets, six octets, six octets, 45–1500 octets, and four octets, respectively.

Returning to FIG. 1, the FIFO memories 3-211 and 3-210 store data from the receipt controllers 3-203 and 3-201, respectively. The transmission controller 3-204 detects the status of the FIFO memory 3-211, controls the transmission of the transceiver 3-150, and inserts another preamble pattern 4-1 and another frame starting delimiter 4-2 into the MAC packet to transmit. Furthermore, the transmission controller 3-204 controls the transmission of the LAN controller 3-160 through the LANC transmission control line 3-220.

Similarly, the transmission controller 3-202 detects the status of the FIFO 3-210, controls the transmission of the transceiver 3-151 and inserts another preamble pattern 4-1 and another frame starting delimiter 4-2 into the MAC packet to transmit.

The path switch-over 3-205 selects one of the data output from the transmission controller 3-204 and the data output from the LAN controller 3-160 to transmit it under control of the transmission controller 3-204. In addition, the LAN controller 3-160 in the IAN connection circuit 3-100 implements generation and analysis of packets pursuant to the instruction of the central control unit 3-170.

Figure 3:
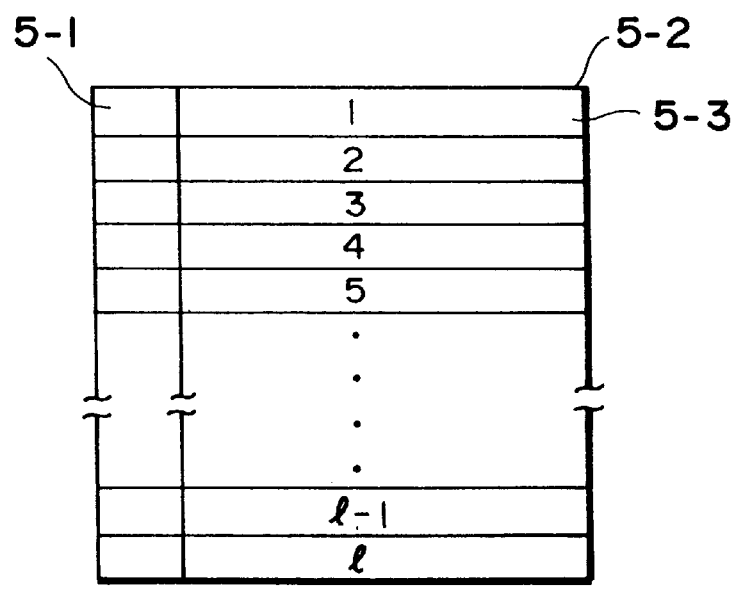
FIG. 3 is a diagram showing the internal structure of the FIFO memory in the network connection circuit.

Hereinbelow, the structures of the FIFO memories 3-211 and 3-210 will be explained in detail with reference to FIG. 3. In FIG. 3, the data storage area 5-2 of the FIFO memories 3-211 and 3-210 is divided into the data areas 5-3 by one octet, and is also provided with the packet final position indication bit 5-1 for each data area 5-3, which is composed of one bit. The data are sequentially stored from the upper to the lower while being sequentially read out similarly.

The FIFO memory 3-210 serves to generate the preamble pattern 4-1 and buffers the time lag, for example, between the clock frequency of the transmission LAN terminal and that of the receipt LAN terminal. In addition to those functions, the FIFO memory 3-211 serves to temporally store the data from the receipt controller 3-203 during data transmission of the LAN controller 3-160. Consequently, the size of the FIFO memory 3-211 is much larger than that of the FIFO memory 3-210.

Figure 4:
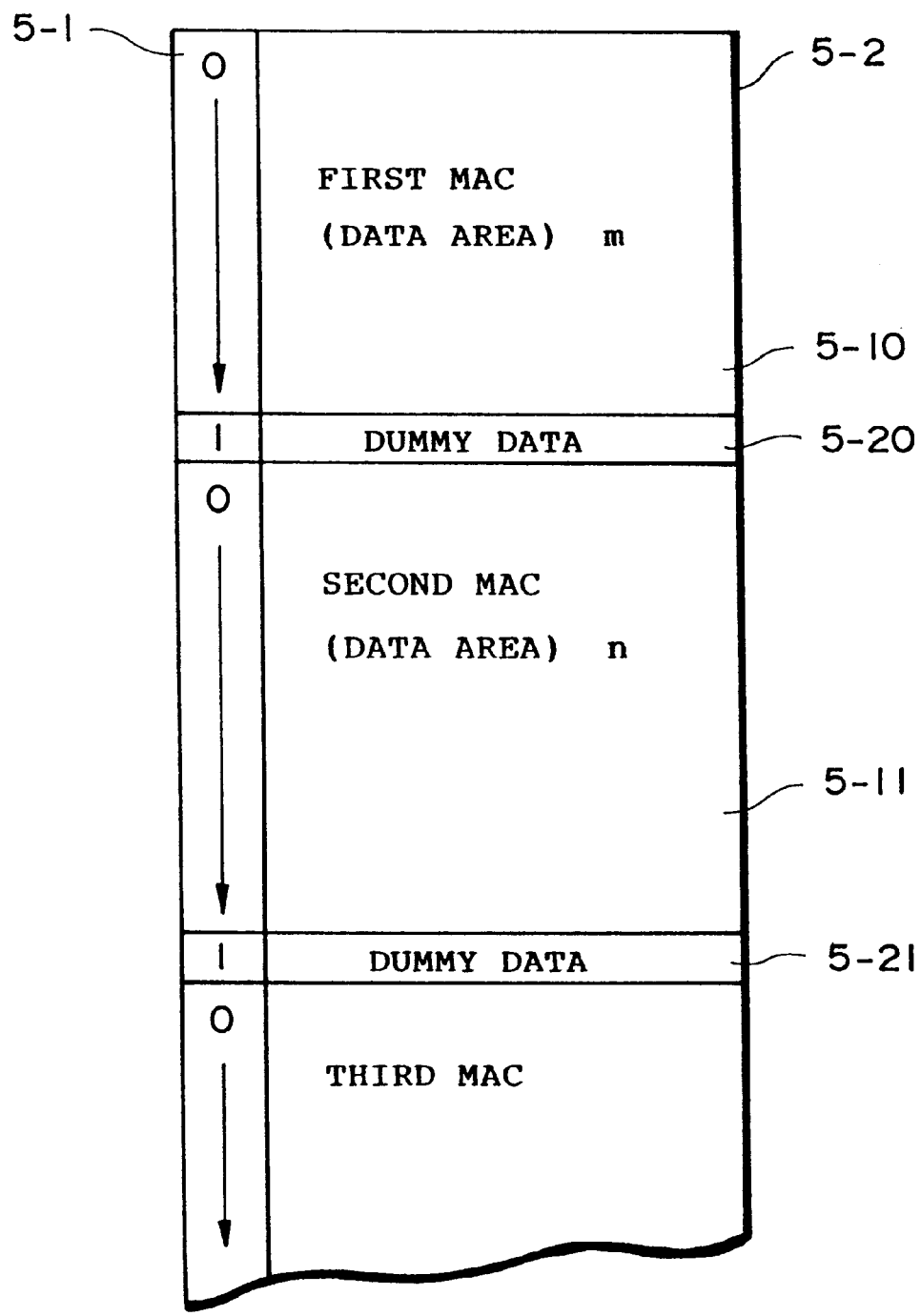
FIG. 4 is a exemplary diagram showing data storage in the FIFO memory of FIG. 3.

In FIG. 4, the first MAC composed of m octets, which is a MAC to be first transmitted, is stored in the head area 5-10 including m data areas of the data storage area 5-2. Similarly, the second MAC of n octets following the first MAC, is stored in the following area 5-11 including n data areas. On the other hand, all of the packet final position bits 5-1 related to the area 5-10 are assigned "0", which represents the continuity of the packet data. At the place 5-20 between the area 5-10 and the area 5-11 is laid a dummy data, with its packet final position bit 5-1 assigned "1", which represents the break of those areas 5-10 and 5-11, or the first MAC and the second MAC.

Figure 5:
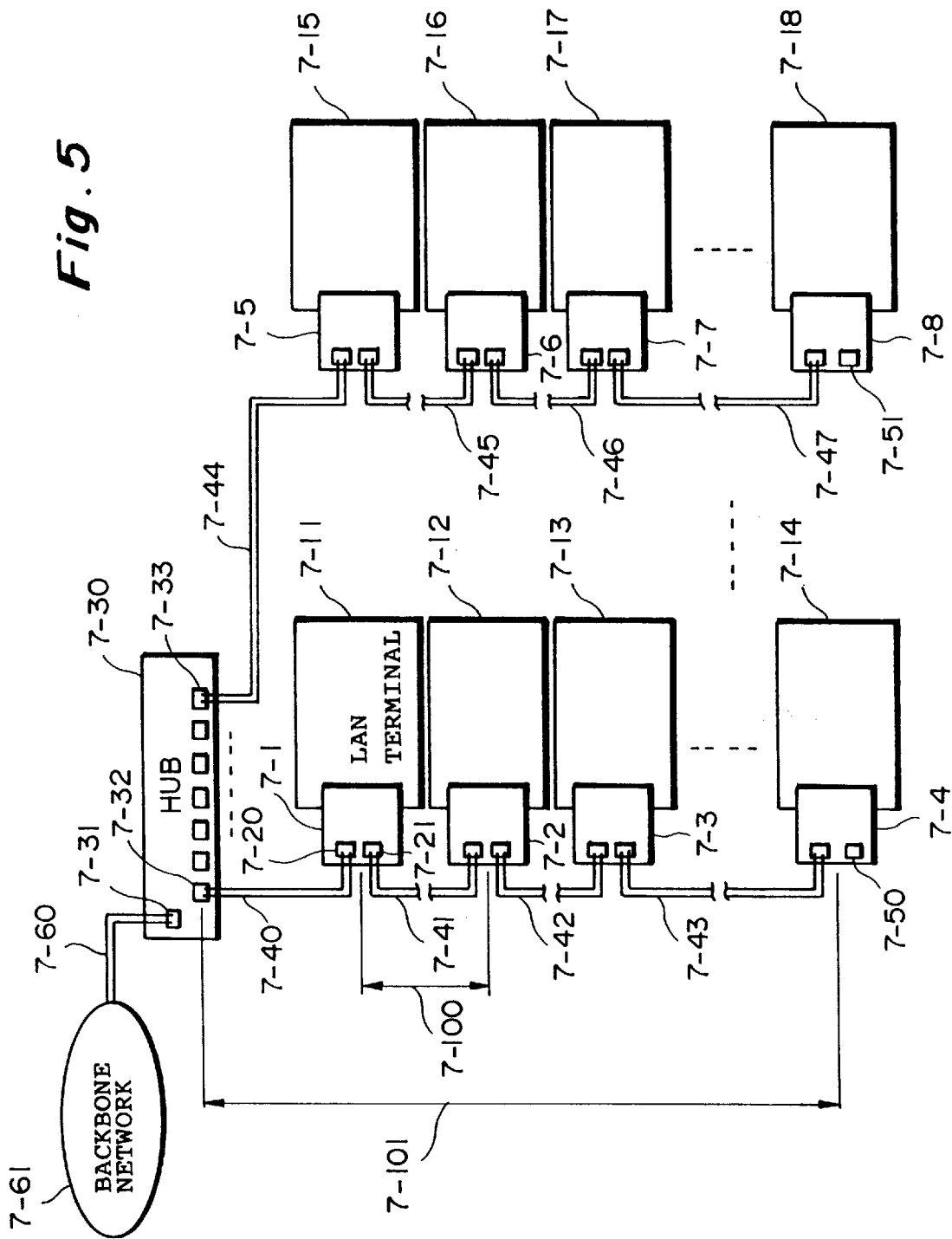
FIG. 5 is a block diagram showing the network system which employs the network connection circuit.

In FIG. 5, the LAN system which incorporates a plurality of LAN terminals 7-11 to 7-18 each including a plurality of LAN connection circuits 7-1 to 7-8 respectively, which have the same configuration and function as those of the LAN connection circuit 3-100. The LAN terminals 7-11 to 7-14 are cascaded to each other using the LAN cables 7-41 to 7-43, wherein the LAN terminal 7-1 is connected to the terminal port 7-32 of the network line concentrator (HUB) 7-30 via the LAN cable 7-40 while the LAN connector 7-50 of the LAN terminal 7-14 is terminated. Similarly, the LAN terminal 7-15 to 7-18 are cascaded to each other using the LAN cables 7-45 to 7-47, wherein the LAN terminal 7-15 is connected to the terminal port 7-33 of the network line concentrator (HUB) 7-30 via the LAN cable 7-44 while the LAN connector 7-51 of the LAN terminal 7-18 is terminated.

For LAN communication and WAN communication, the LAN system has the backbone network 7-61 which is connected to the LAN port 7-31 of the network line concentrator (HUB) 7-30 via the LAN cable 7-60. Upon receipt of data through a port from a LAN terminal, the network line concentrator (HUB) 7-30 forwards the data through the port corresponding to the destination LAN terminal.

Figure 6:
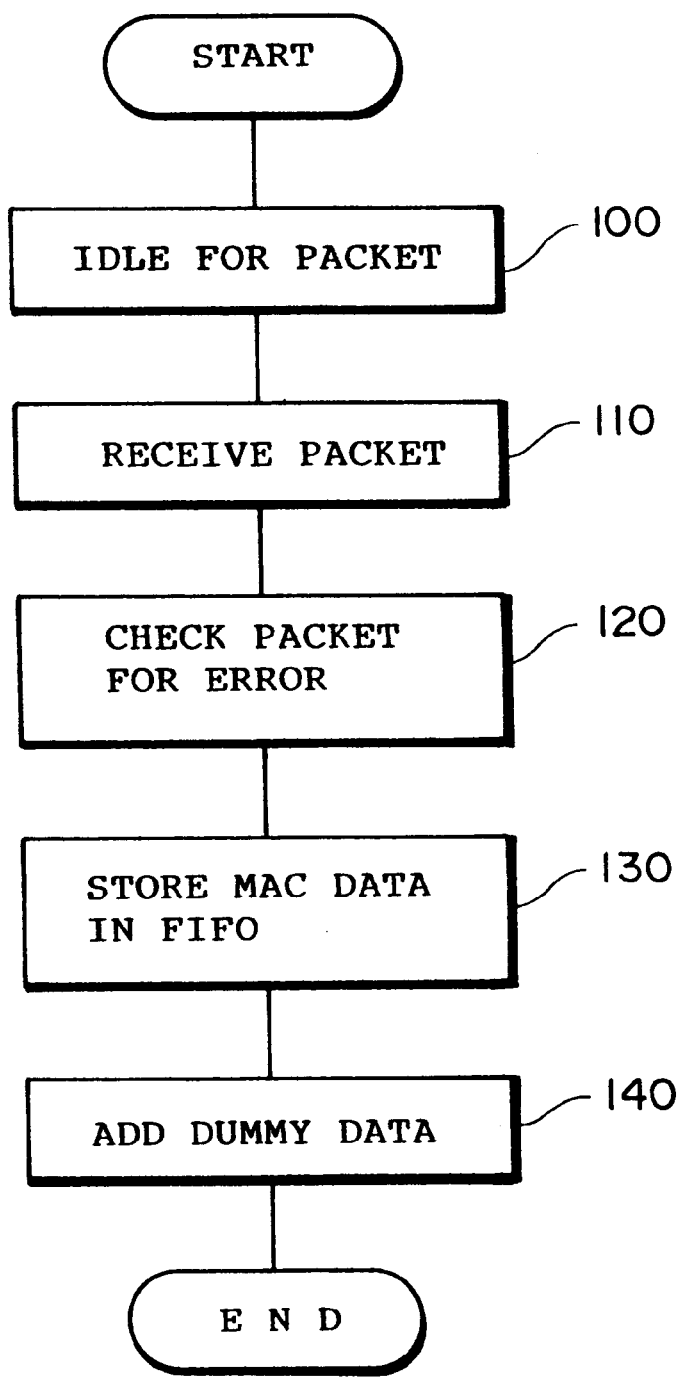
FIG. 6 is a flowchart showing the operation of the receipt controller in the network connection circuit.

Hereinbelow, the operations of the receipt controllers 3-203 and 3-201, and the transmission controllers 3-204 and 3-202 in the LAN connection circuit 3-100, that is to say, the LAN connection circuits 7-1 to 7-8, will be now described with reference to FIG. 6. The receipt controller 3-201 idles, at step 100. Upon notification of receiving a packet from the transceiver 3-151, the receipt controller 3-201 receives the packet therefrom and also the packet is directly fed to the LAN controller 3-160, at step 110. Thereafter, the receipt controller 3-201 checks the packet for errors, at step 120. If any error is detected, the packet is discard, whereby the receipt controller 3-201 returns to idling. In case of no error, the receipt controller 3-201 stores in the FIFO memory 3-210 the MAC data, which corresponds to the destination address 4-3, the origination address 4-4, data 4-5, and CRC 4-6, but stores neither the preamble pattern 4-1 nor the SFD 4-2, at step 130. After completion of storing, the receipt controller 3-201 adds the dummy data 5-20 and the packet final position indication bit 5-1 of "1", at step 140. In this way, the receipt operation of the receipt controller 3-201 is completed, and returns to idling for another packet.

Figure 7:
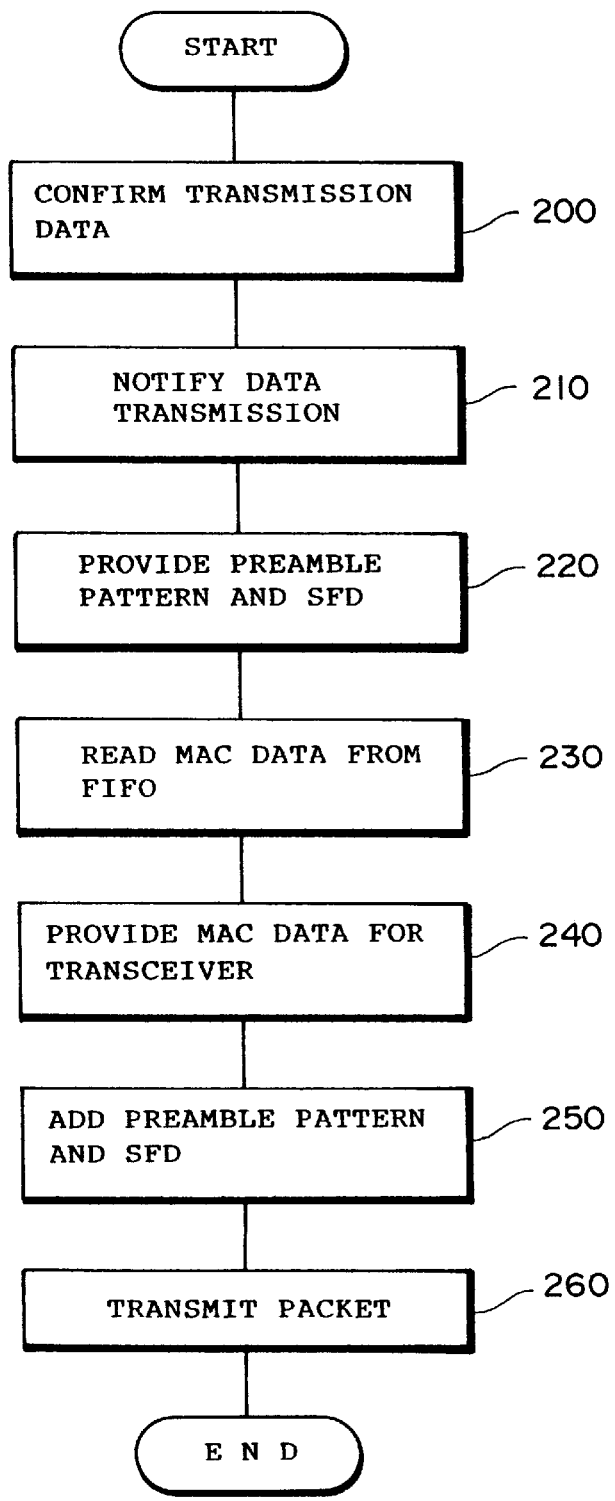
FIG. 7 is a flowchart showing the operation of a transmission controller in the network connection circuit.

Next, the operation of the transmission controller 3-202 will be described with reference to FIG. 7. At step 200, the transmission controller 3-202 confirms whether or not the FIFO memory 3-210 stores data therein. Upon confirming any data, the transmission controller 3-202 notifies the transceiver 3-151 of preparing for data transmission, at step 210. Further, the transmission controller 3-202 provides the transceiver 3-151 with the preamble pattern 4-1 and the SFD 4-2, at step 220. At step 230, the transmission controller 3-202 reads the data, that is to say, MAC data and the packet final position indication 5-1 by data area unit from the FIFO memory 3-210. At step 240, the transmission controller 3-202 provides the transceiver 3-151 with the MAC data by data area unit, which continues until the packet final position indication bit 5-1 relevant to the data is "1". Meanwhile, at step 250, the transceiver 3-151 adds the preamble pattern 4-1 and the SFD 4-2 which have been received beforehand, to the MAC data received from the transmission controller 3-202, thus forming a packet to transmit it via the packet transmission filter 3-142, at step 260. In this way, the transmission data of the transmission controller 3-202 is completed.

Figure 8:
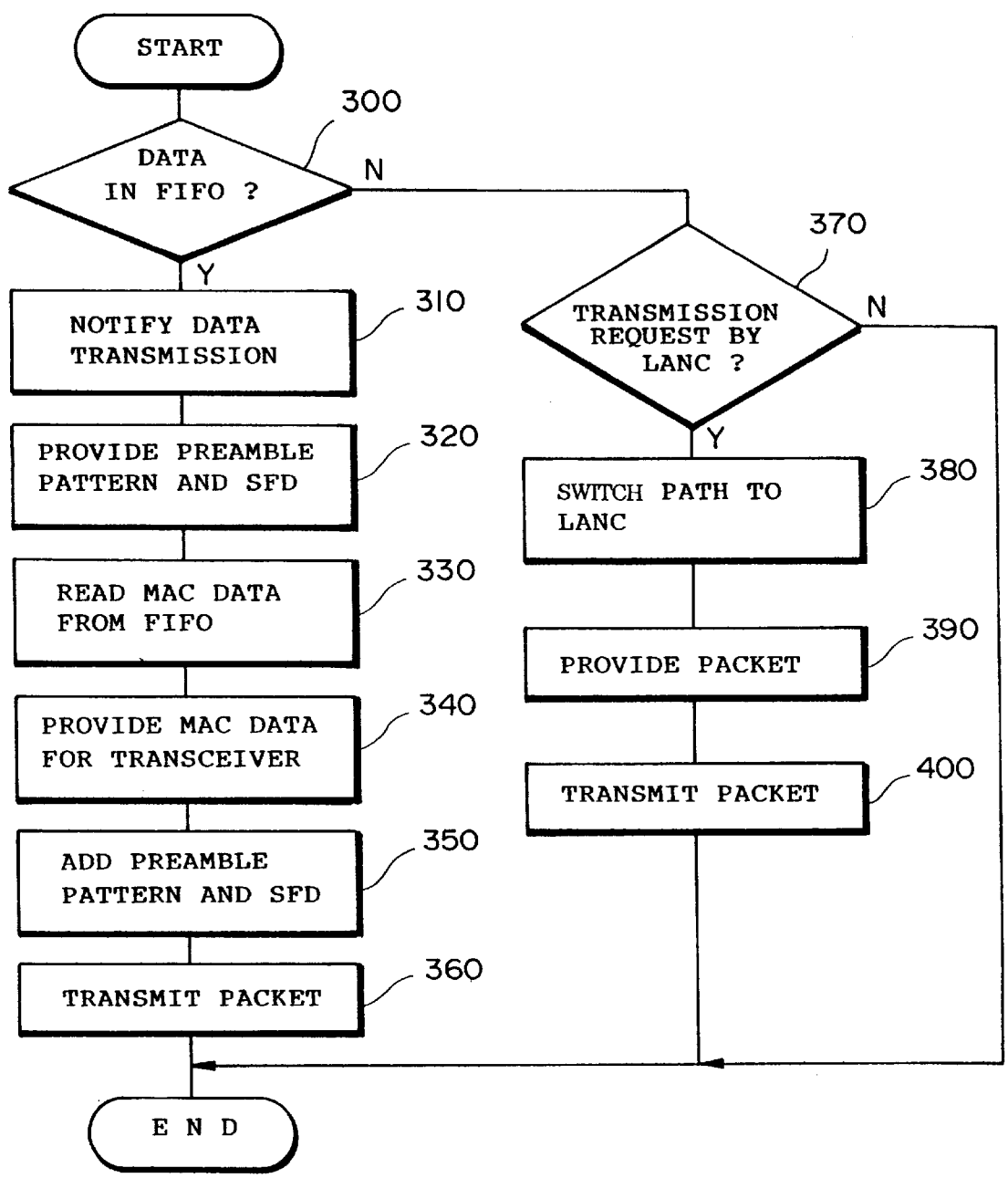
FIG. 8 is a flow chart showing the operation of another transmission controller in the network connection circuit.

Hereinbelow, the operation of the transmission controller 3-204 will be described in detail with reference to FIG. 8 depicting the flowchart thereof. Since the priority of data transmission of the transmission controller 3-204 is superior to that of the IAN controller 3-160, the path switch-over 3-205 is preset so as to lead to the FIFO memory 3-211. First, the transmission controller 3-204 judges whether or not the FIFO memory 3-211 stores data therein, at step 300. If there is any data, the procedure advances to step 310; otherwise, it advances to step 370. At step 310, the transmission controller 3-204 notifies the transceiver 3-150 of preparing for data transmission. Further, the transmission controller 3-204 provides the transceiver 3-150 with preamble pattern 4-1 and the SFD 4-2, at step 320. Moreover, the transmission controller 3-204 reads the data, that is, MAC data and the packet final position indication 5-1 by data area unit from the FIFO memory 3-211, at step 330. At step 340, the transmission controller 3-204 provides to transceiver 3-150 with the MAC data by data area unit, which continues until the packet final position indication bit 5-1 is "1". On the other hand, at step 350, the transceiver 3-150 adds the preamble pattern 4-1 and the SFD 4-2 to the MAC data to form a packet, thereby transmitting it via the packet transmission filter 3-141, at step 360. On the contrary, at step 370 where the FIFO memory 3-211 does not store any data therein, the transmission controller 3-204 confirms whether the IAN controller 3-160 has a request for transmitting a packet. If any request, the transmitter controller 3-204 switches the path of the path switch-over 3-205 to the LANC side, at step 380, and also permits data transmission of the LAN controller 3-160. Further, at step 390, the LAN controller 3-160 provides a packet for the transceiver 3-150 via the path switch-over 3-205, whereby the transceiver 3-150 transmits the packet via the packet transmission filter 3-141, at step 400. In this way, the transmission data of the LAN controller 3-160 is completed.

As described above, the receipt controller 3-201 and the transmission controller 3-202 can forward packets from the HUB side to the neighbouring LAN terminal cooperatively. Besides, the packets from HUB side can be fed to the LAN controller 3-160 via the transceiver 3-151. Similarly, the receipt controller 3-203 and the transmission controller 3-204 can cooperatively forward packets from the neighbouring LAN terminal side to HUB side. In addition, the packets from the LAN controller 3-160 can be transmitted to the HUB side under control of the transmission controller 3-204, wherein the transmission controller 3-204 selectively switches the path of the path switch-over 3-205 to one of the FIFO memory 3-211 and the IAN controller 3-160.

Figure 9:
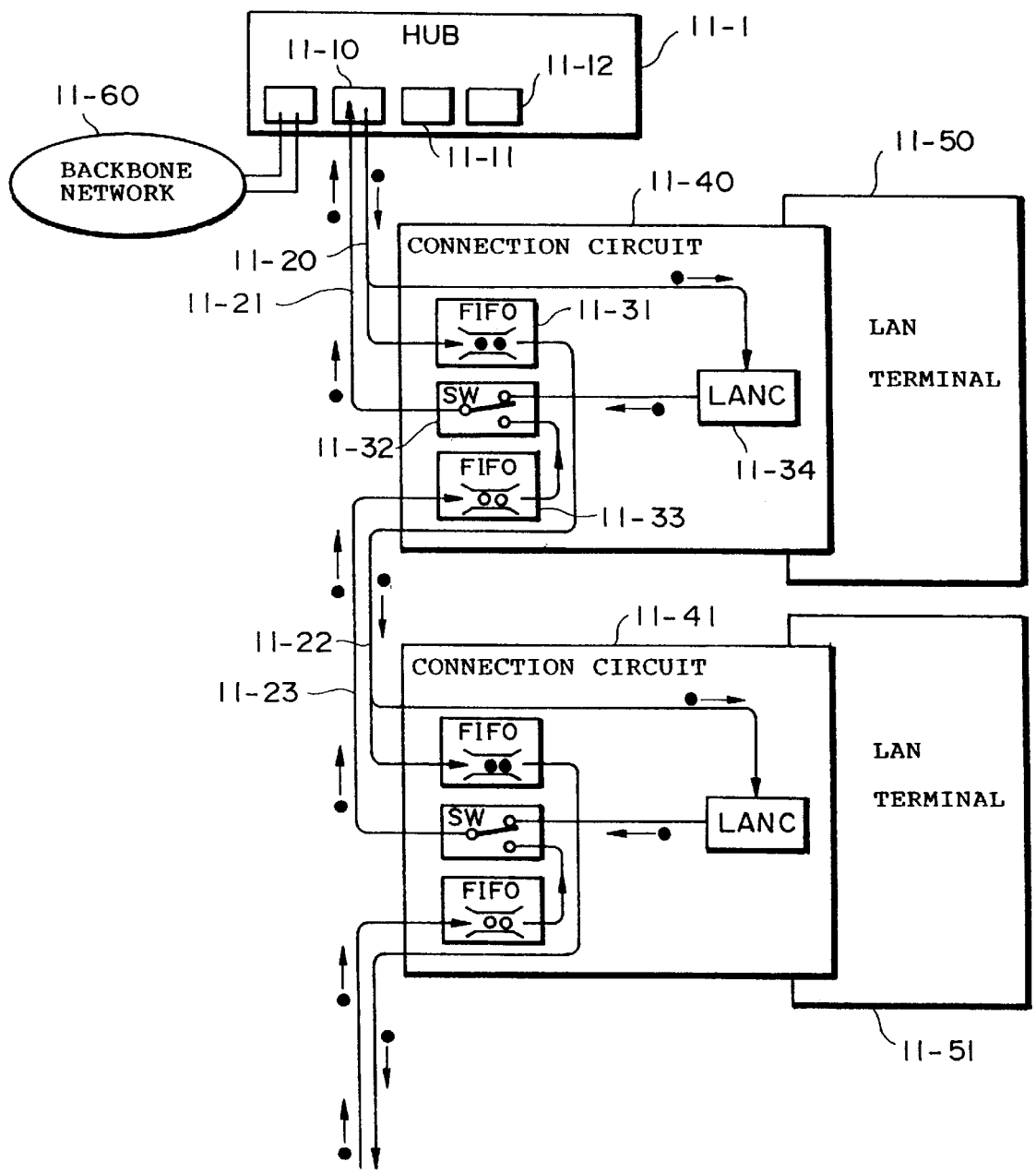
FIG. 9 is a block diagram showing the data flow in the network system.
Figure 10:
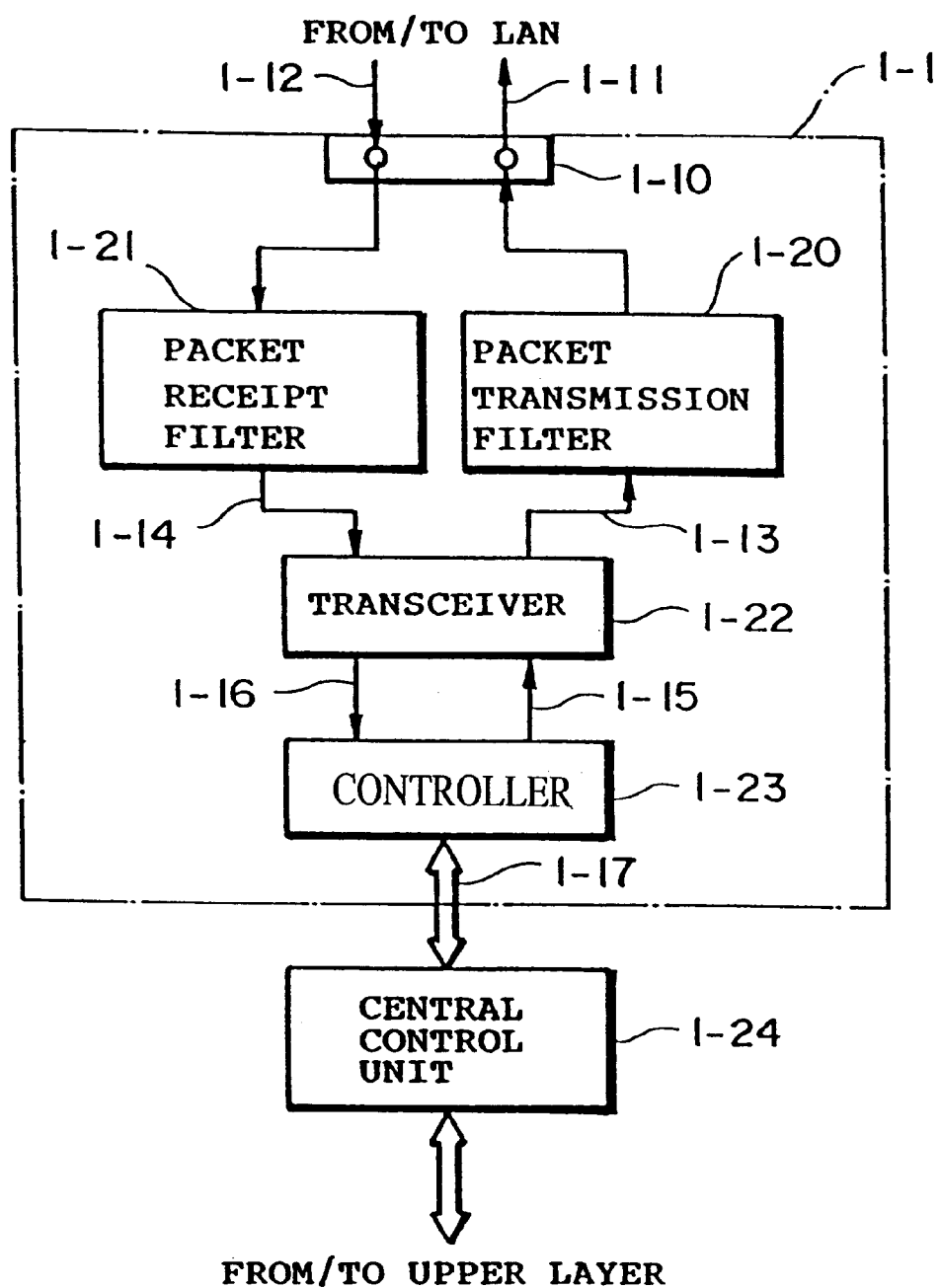
FIG. 10 is a block diagram showing the structure of the conventional network connection circuit.
Figure 11:
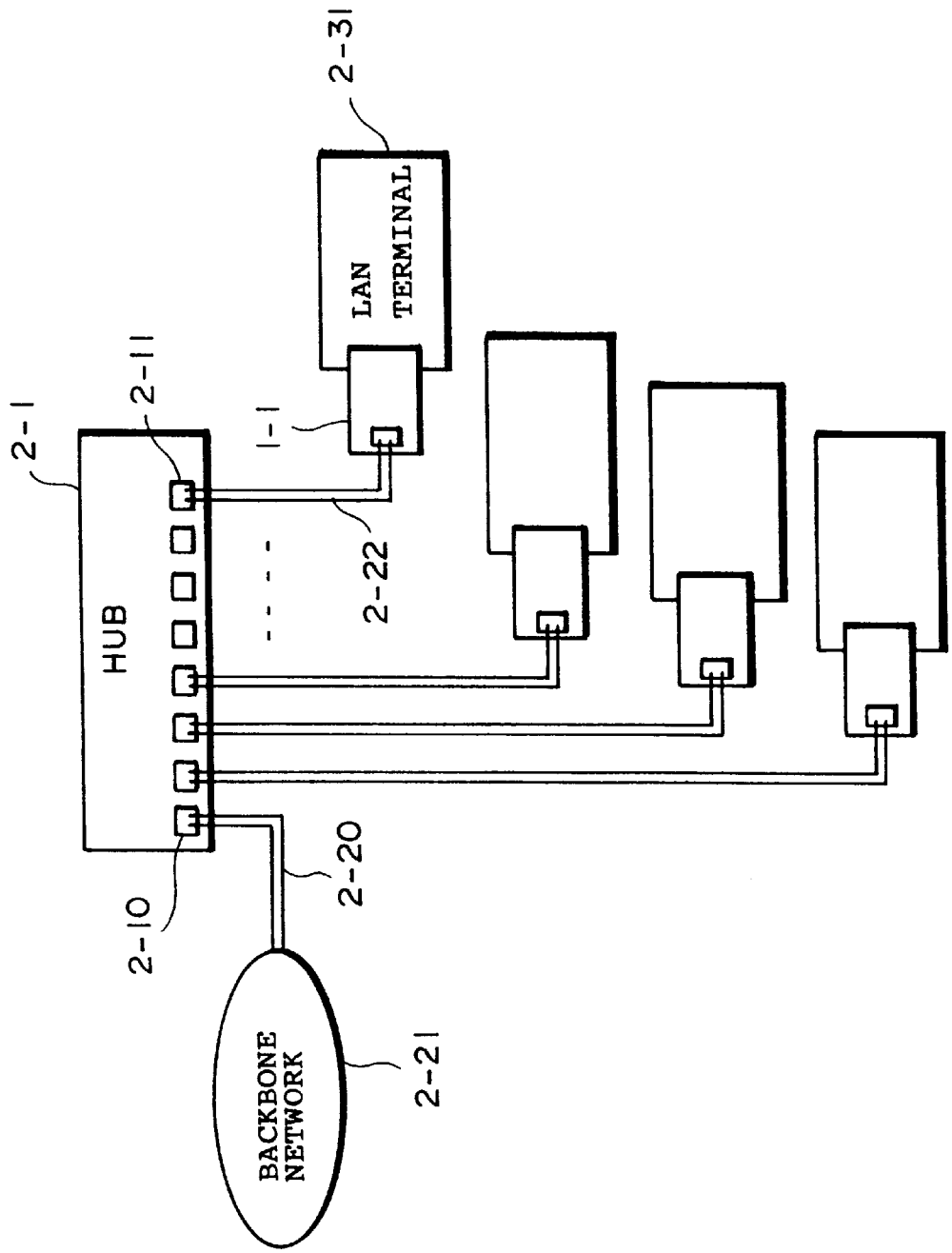
FIG. 11 is a block diagram showing the structure of the conventional network system.

Hereinafter, the packet flow in the network system which incorporates LAN terminals including the LAN connection circuit according to this invention, will be now described with reference to FIG. 9. As shown in FIG. 9, the network system incorporates the network line concentrator 11-1 having a plurality of LAN ports 11-10, 11-11, and 11-12 such as HUB, a plurality of LAN terminals 11-50 and 11-51, and the backbone network 11-60, wherein the network line concentrator (HUB) 11-1 is connected to the backbone network 11-60. Moreover, the network line concentrator (HUB) 11-1 is connected to the neighbouring LAN terminal 11-50 via the LAN cables 11-20 and 11-21, and further the LAN terminal 11-50 is connected to the adjacent LAN terminal 11-51 via the LAN cables 11-22 and 11-23. In short, the network line concentrator 11-1, the LAN terminal 11-50, and the LAN terminal 11-51 are cascaded using the LAN cables 11-20 to 11-23, which is supported by the LAN connection circuits 11-40 and 11-41. As described hereinbefore, the LAN connection circuit 11-40 incorporates the FIFO memory 11-31, the path switch-over 11-32, the FIFO memory 11-33, and the LAN controller (LANC) 11-34. The structure of the LAN connection circuit 11-41 is the same as that of the LAN connection circuit 11-40.

Hereinafter, data flow from the network line concentrator (HUB) 11-1 to each of the LAN terminals 11-50 and 11-51 will be described with reference to FIG. 9. First, the network line concentrator (HUB) 11-1 transfers data to the LAN terminal 11-50 via the LAN cable 11-20, wherein the FIFO memory 11-31 stores the data therein while the LAN controller (LANC) 11-34 receives the data. Next, the data stored in the FIFO memory 11-31 undergoes buffering to be forwarded to the LAN terminal 11-51 via the LAN cable 11-22, whereas the data in the LAN controller (LANC) 11-34 is fed to the LAN terminal 11-50.

Next, data flow from the LAN terminal 11-51 to the network line concentrator (HUB) 11-1 will be described. The LAN terminal 11-51 sends data toward the network line concentrator (HUB) 11-1 via the LAN cable 11-23, wherein the data is stored in the FIFO memory 11-33. Here, if the LAN controller (LANC) 11-34 transfers no data via the path switch-over 11-32, the data in the FIFO memory 11-33 experiences buffering to be forwarded to the network line concentrator (HUB) 11-1 via the path switch-over 11-32 and the LAN cable 11-21. If the LAN controller (LANC) 11-34 is in data transferring, the data in the FIFO memory 11-33 waits for completion of transferring by the LAN controller (LANC) 11-34. Thereafter, the data in the FIFO memory 11-33 is forwarded. On the contrary, during forwarding the data in the FIFO memory 11-33, the LAN controller (LANC) 11-34 waits for completion of forwarding the data in the FIFO memory 11-33. In this way, since forwarding the data in the FIFO memory 11-33 has priority over forwarding the data in the LAN controller (LANC) 11-34, the amount of data buffered in the FIFO memory 11-33 never exceeds the maximum packet size in the Ethernet.

As described heretofore, the network connection circuit serves to cascade the network line concentrator and a plurality of LAN terminals. With an additional LAN terminal, this makes it unnecessary to add another network line concentrator in the network system and to directly connect the additional LAN terminal to the current network line concentrator, thus reducing cost and time for add-on of the additional LAN terminal.

Furthermore, if a failure arises in a LAN terminal, the other LAN terminal positioned downward is connected toward the network line concentrator, bypassing the troublesome LAN terminal, whereby communication between the LAN terminal and the network line concentrator is secured.

Moreover, the transmission controller and the path switch-over control the packet transmission by the LAN terminal neighbouring downward to the network line concentrator and the packet transmission by the LAN controller to the network line concentrator, which can avoid collisions between these transmission packets.

What is claimed is:

1. A network connection circuit for use in a first terminal that is included in a sequence of at least two terminals which are cascade-connected to a network line concentrator, the sequence of at least two terminals additionally including a second terminal and the first terminal being disposed in the sequence between the network line concentrator and the second terminal, said network connection circuit comprising:
   a first forwarding circuit for receiving first data sent from the network line concentrator and transferring the first data toward the second terminal;
   a second forwarding circuit for receiving second data sent from the second terminal and transferring the second data toward the network line concentrator; and
   a controller for receiving the first data from the first forwarding circuit for subsequent processing thereof in the first terminal, and for feeding third data produced in the first terminal to the second forwarding circuit for transfer toward the network line concentrator;
   wherein the second forwarding circuit selectively transfers the second data and the third data toward the network line concentrator.

2. The network connection circuit according to claim 1, wherein the second forwarding circuit gives priority to transferring the second data toward the network line concentrator over transferring the third data toward the network line concentrator.

3. The network connection circuit according to claim 1, wherein the second forwarding circuit starts to transfer the third data toward the network line concentrator only if no second data remains in the second forwarding circuit.

4. The network connection circuit according to claim 3, wherein once transfer of the third data toward the network line concentrator is started, the second forwarding circuit delays transfer of the second data until the transfer of the third data is completed.

5. The network connection circuit according to claim 1, further comprising a first bypass circuit for directly transferring the first data sent from the network line concentrator toward the second terminal if a failure occurs in the first terminal, and a second bypass circuit for directly transferring the second data sent from the second terminal toward the network line concentrator upon the occurrence of the failure.

6. The network connection circuit according to claim 1, wherein the sequence of terminals additionally includes a third terminal which is disposed between the network line concentrator and the first terminal, and wherein the first forwarding circuit receives the first data sent from the network line concentrator via the third terminal, and the second forwarding circuit transfers one of the second and third data toward the network line concentrator via the third terminal.

7. The network connection circuit according to claim 1, wherein the first forwarding circuit comprises first storage means for temporarily storing the first data, and the second forwarding means comprises second storage mans for temporarily storing the second data.

8. The network connection circuit according to claim 7, wherein the second storage means has a storage capacity that is larger than the first storage means.

9. The network connection circuit according to claim 7, wherein the first and second storage means both comprise first-in, first-out memories.

10. The network connection circuit according to claim 1, wherein the first forwarding circuit comprises means for reshaping the first data and the second forwarding circuit comprises means for reshaping the second data.

11. A first terminal for use in a sequence of at least two terminals that are cascade-connected to a network line concentrator, the sequence of at least two terminals additionally including a second terminal and the first terminal being disposed in the sequence between the network line concentrator and the second terminal, said first terminal comprising:
    terminal circuitry, including a central control unit; and
    a network connection circuit that is coupled to the terminal circuitry, the network connection circuit including
      a first forwarding circuit for receiving first data sent from the network line concentrator and transferring the first data toward the second terminal,
      a second forwarding circuit for receiving second data sent from the second terminal and transferring the second data toward the network line concentrator, and
      a controller for receiving the first data from the first forwarding circuit for subsequent processing thereof in the first terminal, and for feeding third data produced in the terminal circuitry of the first terminal to the second forwarding circuit for transfer toward the network line concentrator,
    wherein the second forwarding circuit selectively transfer the second data and the third data toward the network line concentrator.

12. The network connection circuit according to claim 11, wherein the second forwarding circuit gives priority to transferring the second data toward the network line concentrator over transferring the third data toward the network line concentrator.

13. The network connection circuit according to claim 11, wherein the second forwarding circuit starts to transfer the third data toward the network line concentrator only if no second data remains in the second forwarding circuit.

14. The network connection circuit according to claim 13, wherein once transfer of the third data toward the network line concentrator is started, the second forwarding circuit delays transfer of the second data until the transfer of the third data is completed.

15. The network connection circuit according to claim 11, further comprising a first bypass circuit for directly transferring the first data sent from the network line concentrator toward the second terminal if a failure occurs in the first terminal, and a second bypass circuit for directly transferring the second data sent from the second terminal toward the network line concentrator upon the occurrence of the failure.

16. The network connection circuit according to claim 11, wherein the sequence of terminals additionally includes a third terminal which is disposed between the network line concentrator and the first terminal, and wherein the first forwarding circuit receives the first data sent from the network line concentrator via the third terminal, and the second forwarding circuit transfers one of the second and third data toward the network line concentrator via the third terminal.

17. A network, comprising:
   a network line concentrator having a first terminal port and a second terminal port;
   a sequence of at least two terminals that are cascade-connected to the first terminal port of the network line concentrator, the sequence of at least two terminals including a first terminal and a second terminal, with the first terminal being disposed in the sequence between the network line concentrator and the second terminal; and
   a third terminal connected to the second terminal port of the network line concentrator,
   wherein the first terminal has a network connection circuit which includes
      a first forwarding circuit for receiving first data sent from the network line concentrator and transferring the first data toward the second terminal,
      a second forwarding circuit for receiving second data sent from the second terminal and transferring the second data toward the network line concentrator, and
      a controller for receiving the first data from the first forwarding circuit for subsequent processing thereof in the first terminal, and for feeding third data produced in the first terminal to the second forwarding circuit for transfer toward the network line concentrator,
   wherein the second forwarding circuit selectively transfer the second data and the third data toward the network line concentrator.

18. The network connection circuit according to claim 17, wherein the second forwarding circuit gives priority to transferring the second data toward the network line concentrator over transferring the third data toward the network line concentrator.

19. The network connection circuit according to claim 17, wherein the second forwarding circuit starts to transfer the third data toward the network line concentrator only if no second data remains in the second forwarding circuit.

20. The network connection circuit according to claim 19, wherein once transfer of the third data toward the network line concentrator is started, the second forwarding circuit delays transfer of the second data until the transfer of the third data is completed.

21. The network connection circuit according to claim 17, further comprising a first bypass circuit for directly transferring the first data sent from the network line concentrator toward the second terminal if a failure occurs in the first terminal, and a second bypass circuit for directly transferring the second data sent from the second terminal toward the network line concentrator upon the occurrence of the failure.

22. The network connection circuit according to claim 17, wherein the sequence of terminals additionally includes a fourth terminal which is disposed between the network line concentrator and the first terminal, and wherein the first forwarding circuit receives the first data sent from the network line concentrator via the fourth terminal, and wherein the second forwarding circuit transfers one of said second and third data toward the network line concentrator via the fourth terminal.

23. The network of claim 17, wherein the third terminal is included in an additional sequence of at least two terminals that are cascade-connected to the second terminal port.

24. The network of claim 23, wherein the network line concentrator has at least one further terminal port.

25. The network of claim 24, further comprising a backbone network, and wherein the network line concentrator additionally has a LAN port for communication with the backbone network.

26. The network of claim 17, further comprising a backbone network, and wherein the network line concentrator additionally has a LAN port for communication with the backbone network.

* * * * *